Aug. 9, 1966  A. J. WILLIAMS  3,265,088
CONTROL VALVES OF THE SERIES TYPE
Filed Oct. 11, 1963

INVENTOR,
ARTHUR J. WILLIAMS

3,265,088
CONTROL VALVES OF THE SERIES TYPE

Arthur J. Williams, Hubbard, Ohio, assignor to Commercial Shearing & Stamping Company, a corporation of Ohio
Filed Oct. 11, 1963, Ser. No. 315,575
5 Claims. (Cl. 137—596.12)

This invention relates to control valves of the series type and particularly to a series type valve adapted to be intermingled with parallel type valves such as the Types A–20 and A–35 valves manufactured by Commercial Shearing and Stamping Company of Youngstown, Ohio.

There are certain situations in which it is desirable to use one or more series type valves in an assembly of valves which are predominately of parallel construction. In such situations in the past, it has been necessary to use the series valve alone or to make it the last valve in the assembly because the interposition of a series valve in a parallel type assembly would prevent all flow of fluid beyond the series valve when such valve was operating. This is an undesirable condition and made the design of hydraulic systems incorporating series valves extremely difficult and in many cases virtually impossible.

I have invented a series valve which overcomes these problems and makes possible the random placement of series valves in assemblages of parallel valves which was not heretofore possible.

I provide in a preferred embodiment a housing having a bore extending therethrough and open at each end to receive an elongated spool valve element, a fluid inlet in said housing extending transverse to said bore and intersecting the bore intermediate its ends, a pair of fluid outlets in said housing extending transversely of said bore and intersecting the bore one on each side of the fluid inlet at a point adjacent to but spaced from the intersection of the inlet passage, a valve element slidable in said bore, a pair of high pressure outlets intersecting the bore one on either side of the said fluid inlet and outlet, a pair of exhaust outlets in the housing intersecting the bore on either side of the fluid inlet and outlet, and passage means communicating between the fluid inlet and the bore adjacent each of the high pressure outlets, said valve element having a neutral position in which fluid passes directly through the fluid inlet and the bore into the fluid outlets, and a power position for each high pressure outlet which directs fluid from the fluid inlet through the said passage means to one high pressure outlet while directing fluid from the other high pressure outlet to a fluid outlet. Preferably, check valve means are provided between the fluid inlet and the passage means to prevent back flow from a cylinder or motor to the inlet.

Since the valve of this invention is most frequently used in connection with a double acting hydraulic cylinderd to be used for raising and lowering a load, I shall describe it in connection with raising and lowering of such a cylinder.

In the foregoing general description I have set out certain objects, advantages and purposes of my invention. Other objects, advantages and purposes of the invention will be apparent from the following description and the accompanying drawing in which FIGURE 1 is a vertical section through a valve according to my invention in the neutral position;

Figure 1:
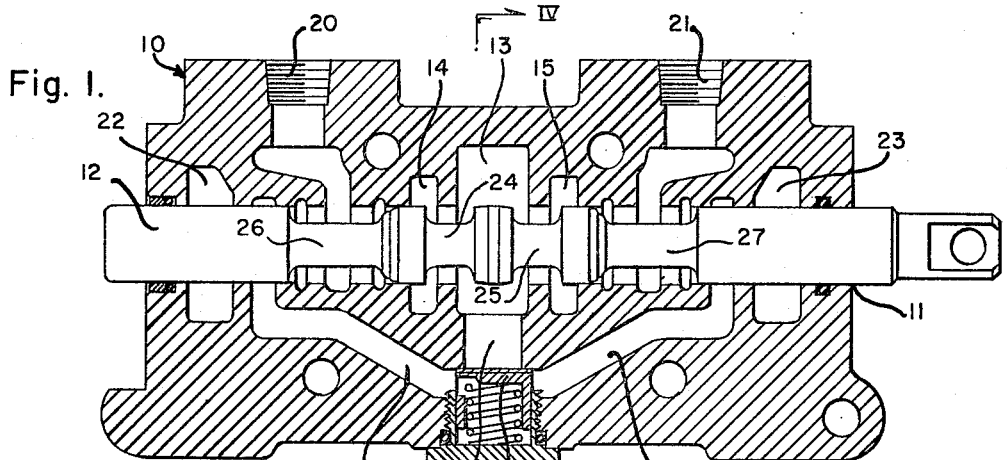

Referring to the drawings I have illustrated a valve body or housing 10 having a bore 11 and an axially movable valve element or spool 12 slidable in bore 11. A high pressure inlet 13 intersects the bore 11 intermediate its ends and communicates to the exterior of the housing. Spaced fluid outlets 14 and 15 intersects the bore 11 spaced from and on opposite sides of high pressure inlet 13. The fluid outlets 14 and 15 communicate to the exterior of the housing opposite the inlet bore through a single elongated port 50. A passage 16 connects the high pressure inlet 13 with the bore 11 through check valve 17 bifurcated arms 18 and 19. High pressure outlets 20 and 21 intersect the bore 11 between the arms 18 and 19 and fluid outlets 14 and 15. Exhaust outlets 22 and 23 extend through the housing parallel to high pressure inlet 13 and fluid outlets 14 and 15 and intersect bore 11 adjacent its two ends. The exhaust outlets 22 and 23 serve to protect the seals at the end of bore 11 against high pressure fluid and connect the exhaust passages of preceding and following parallel type valves (not shown).

In the neutral position shown in FIGURE 1, fluid enters high pressure inlet 13 from a next preceding valve or inlet section (not shown) and passes through grooves 24 and 25 in the valve through bore 11 into fluid outlets 14 and 15 which discharge to the next valve. Simultaneously, fluid enters passage 16 and arms 18 and 19 through check valve 17 to pressurize passage 16 and arms 18 and 19.

Figure 2:
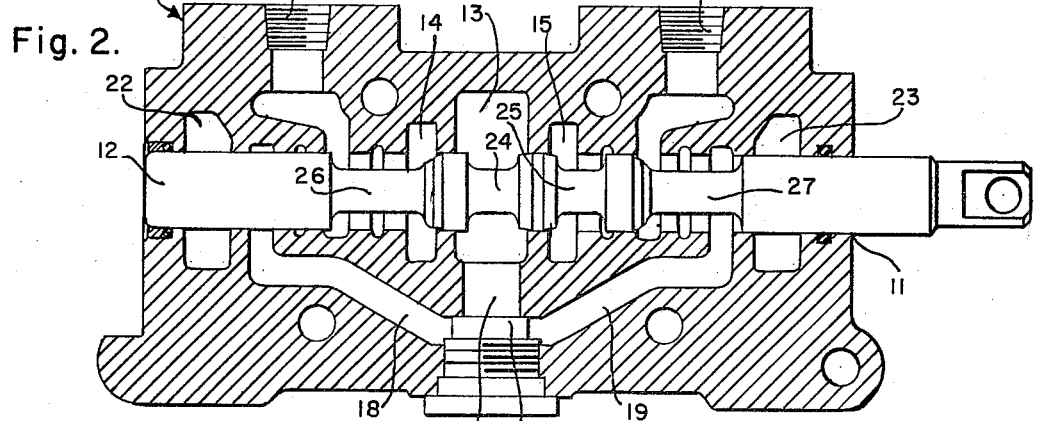
FIGURE 2 is a section identical with that of FIGURE 1 with the valve element in the raise position.

In the raise position shown in FIGURE 2, fluid again enters fluid inlet 13 but is blocked from entering fluid outlets 14 and 15 by the lands on opposite sides of groove 24. Fluid from inlet 13 passes through passage 16 check valve 17 and arm 19 to the bore 11 where it passes through groove 27 in spool 12 to high pressure outlet 21 and to the working cylinder (not shown). Fluid from the opposite side of the work cylinder returns through high pressure outlet 20 to bore 11 where it passes through groove 26 in spool 12 and into fluid outlet 14 where it is discharged to the next adjacent following valve.

Figure 3:
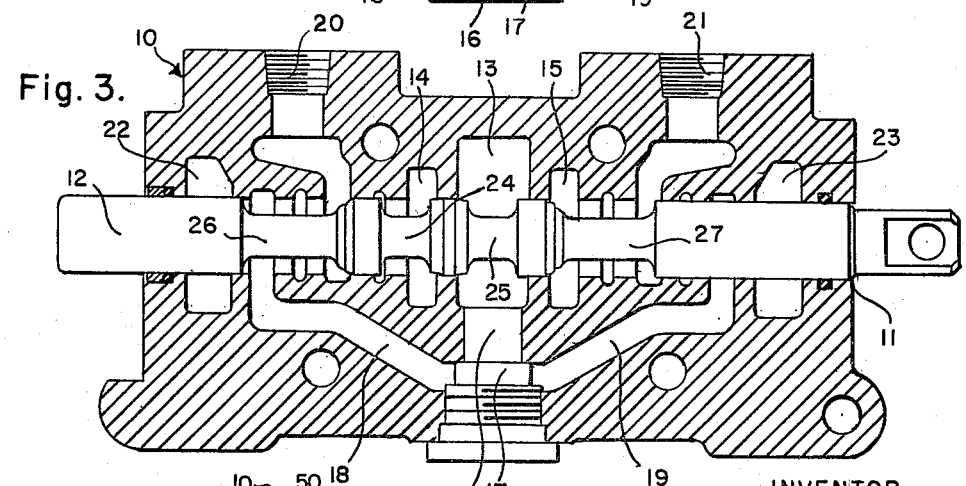
FIGURE 3 is a section identical with that of FIGURE 1 with the valve element in the lower position.
Figure 4:
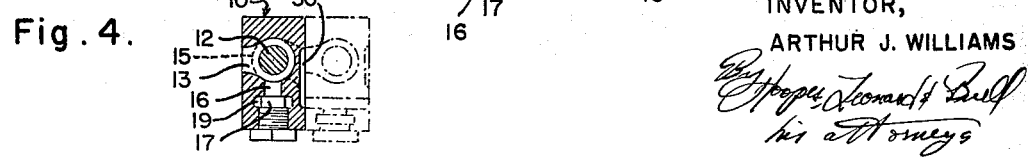
FIGURE 4 is a section on the line IV—IV of FIGURE 1 showing the fluid outlet port adapted to connection with a downstream parallel valve.

FIGURE 3 illustrates the valve of this invention in the lower position with fluid entering fluid inlet 13 and passing through passage 16 to arm 18 through check valve 17. From arm 18 the fluid enters bore 11 through groove 26 and passes to the high pressure outlet 20 feeding one side of the work cylinder. Return fluid from the work cylinder enters high pressure outlet 21 and passes through bore 11 along groove 27 to fluid outlet 15 from which it leaves the valve body to the next adjacent valve.

It will be seen from this structure that the return fluid entering the valve is never exhausted to the exhaust ports but always to the fluid output to feed the next adjacent valve, thereby providing a source of fluid permitting operation of the next valve simultaneously with the valve of this invention.

In the foregoing specification and accompanying drawings, I have illustrated a present preferred embodiment of my invention, however, it will be understood that this invention may be otherwise embodied within the scope of the following claims.

I claim:

1. In a control valve of the series type adapted for use in an assembly of parallel type valves, a housing having a bore extending therethrough and open at each end to receive an elongated spool valve element, a fluid inlet in said housing extending transverse to said bore and intersecting the bore intermediate its ends, a pair of fluid outlets in said housing extending transversely of said bore and intersecting the bore one on each side of the fluid inlet at a point adjacent to but spaced from the intersection of the inlet passage, a valve element slidable in said bore, a pair of high pressure outlets intersecting the bore one on either side of the said fluid inlet and outlet, a pair of exhaust outlets in the housing intersecting the bore on either side of the fluid inlet and outlet, and passage means communicating between the fluid inlet and the bore adjacent each of the high pressure outlets, said valve element having a neutral position in which fluid passes directly through the fluid inlet and the bore into the fluid outlets, and a power position for each high pressure outlet which directs fluid from the fluid inlet through the said passage means to one high pressure outlet while directing fluid from the other high pressure outlet to a fluid outlet.

2. A control valve as claimed in claim 1 wherein exhaust passages intersect the bore on opposite sides of each high pressure outlet from the fluid inlet.

3. In a control valve of the series type adapted for use in an assembly of parallel type valves, a housing having a bore extending therethrough and open at each end to receive an elongated spool valve element, a fluid inlet in said housing extending transverse to said bore and intersecting the bore intermediate its ends, a pair of fluid outlets in said housing extending transversely of said bore and intersecting the bore one on each side of the fluid inlet at a point adjacent to but spaced from the intersection of the inlet passage, a valve element slidable in said bore, a pair of high pressure outlets intersecting the bore one on either side of the said fluid inlet and outlet, a pair of exhaust outlets in the housing intersecting the bore on either side of the fluid inlet and outlet, and passage means communicating between the fluid inlet and the bore adjacent each of the high pressure outlets, said valve element having spaced grooves arranged so that with the valve element in neutral position fluid passes directly through the fluid inlet through two adjacent grooves and the bore into the fluid outlets, and with the valve shifted in either direction from neutral a power position is provided for each high pressure outlet in which fluid from the fluid inlet passes through the said passage means to one high pressure outlet through a groove in the valve element and the bore while directing fluid from the other high pressure outlet through a spaced groove and the bore to a fluid outlet.

4. In a control valve of the series type adapted for use in an assembly of parallel type valves, a housing having a bore extending therethrough and open at each end to receive an elongated spool valve element, a fluid inlet in said housing extending transverse to said bore and intersecting the bore intermediate its ends, a pair of fluid outlets in said housing extending transversely of said bore and intersecting the bore one on each side of the fluid inlet at a point adjacent to but spaced from the intersection of the inlet passage, a valve element slidable in said bore, a pair of high pressure outlets intersecting the bore one on either side of the said fluid inlet and outlet, a pair of exhaust outlets in the housing intersecting the bore on either side of the fluid inlet and outlet, and passage means communicating between the fluid inlet and the bore adjacent each of the high pressure outlets, said valve element having four spaced grooves separated by lands so that when centered in the housing the valve element provides a neutral position in which fluid passes directly through the fluid inlet and the two intermediate grooves and the bore into the fluid outlets and fills the passage means, and a power position for each high pressure outlet which directs fluid from the fluid inlet through one of the two intermediate grooves and through the said passage means and through a groove in the valve element adjacent one end to one high pressure outlet while directing fluid from the other high pressure outlet through the groove in the valve element adjacent the opposite end to a fluid outlet.

5. A control valve as claimed in claim 4 wherein check valve means is provided in the passage means to limit return of fluid therethrough to the fluid inlet.

References Cited by the Examiner
UNITED STATES PATENTS 2,949,097  8/1960  Vander Kaay _____ 137—596.12
3,215,160 12/1962  Rice _____ 137—625.68

WILLIAM F. O'DEA, *Primary Examiner.*

H. COHN, *Examiner.*